R. B. WOODWORTH.
WHEEL CONSTRUCTION.
APPLICATION FILED NOV. 16, 1910.
1,020,069.
Patented Mar. 12, 1912.
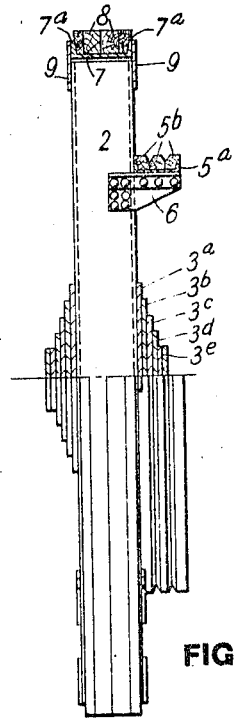
FIG. 2
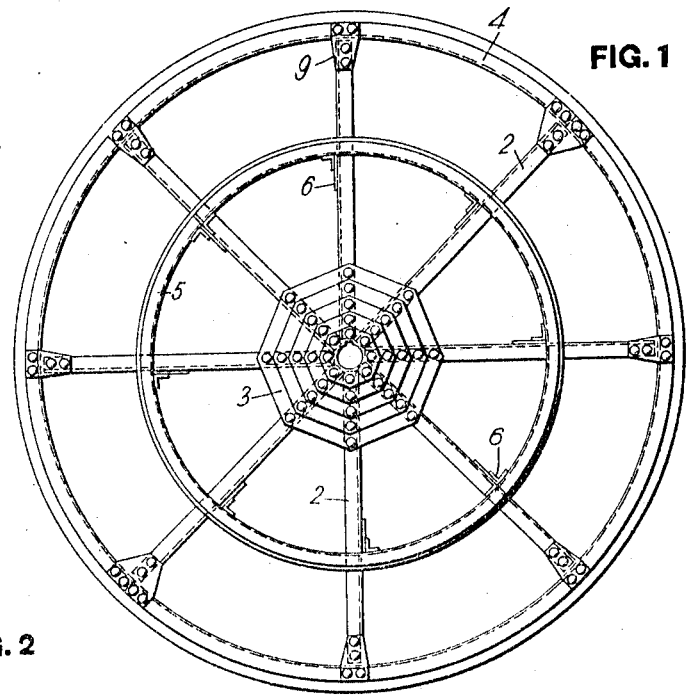
FIG. 1
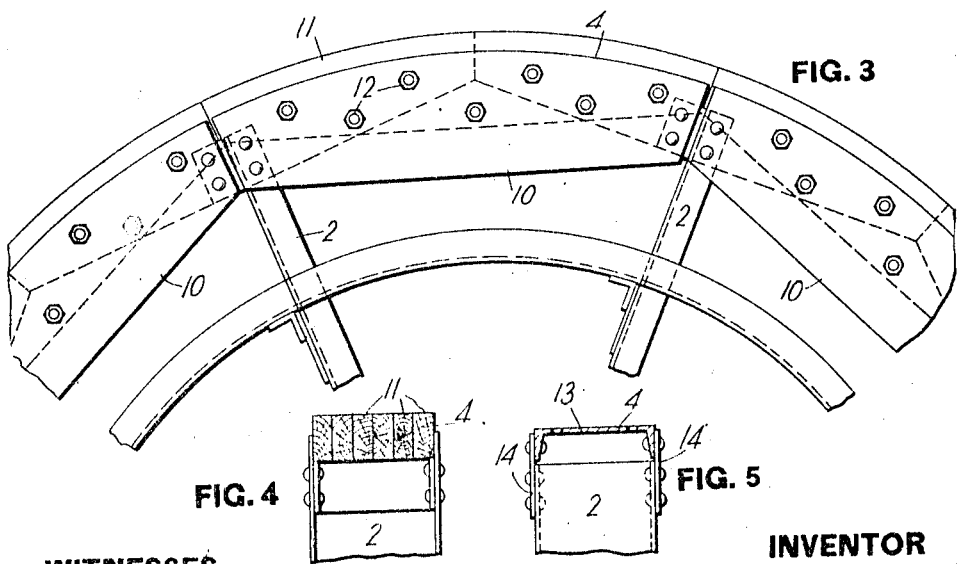
FIG. 3
FIG. 4  FIG. 5
WITNESSES
R. D. Little
Chas. Josterman
INVENTOR
Robert B. Woodworth
by Linthicum Betts Fuller
his Attorneys

UNITED STATES PATENT OFFICE.

ROBERT B. WOODWORTH, OF PITTSBURGH, PENNSYLVANIA.

WHEEL CONSTRUCTION.

1,020,069.  Specification of Letters Patent.  Patented Mar. 12, 1912.

Application filed November 16, 1910. Serial No. 592,709.

*To all whom it may concern:*

Be it known that I, ROBERT B. WOODWORTH, of Pittsburgh, in the county of Allegheny and State of Pennsylvania, have invented certain new and useful Improvements in Wheel Constructions, of which the following is a full, clear, and exact description, reference being had to the accompanying drawings, forming part of this specification.

My invention relates to the construction of band wheels generally, and more particularly to the construction of band wheels used on drilling rigs employed in drilling deep holes, such as oil and gas wells. Heretofore, in constructing such band wheels, they have been built up solidly of wood, this construction forming a wheel of excessive weight compared with its strength.

One object of my invention is to provide an improved band wheel formed of standard rolled metal products and having a hub or center of novel construction.

Another object of this invention is to provide a metal band wheel having a tug wheel of improved construction secured to, so as to form part of, the band wheel.

In the accompanying drawing, Figure 1 is a side elevation of a band wheel constructed and arranged in accordance with my invention. Fig. 2 is an end elevation of the same, the top half of this figure being in section. Fig. 3 is a detail in side elevation of the periphery of a band wheel in which the rim is made up of rolled metal side plates with wooden block inserts forming a wooden periphery or rim. Fig. 4 is a sectional end elevation showing the construction of the rim of the wheel shown in Fig. 3. Fig. 5 is a sectional end elevation similar to that shown in Fig. 4, showing a modified form of construction of the rim portion of the wheel.

In the accompanying drawing, a combined band and tug wheel is shown in which radially extending spokes 2 formed as shown, of rolled metal channels, are employed to connect the built-up center or hub 3 with the rim 4 of the band wheel, and in which the tug wheel 5 is formed by securing the tug wheel rim to brackets 6 which project horizontally from the sides of the spokes 2 of the band wheel.

In forming the hub or center of the wheel, a series of rolled metal plates 3ª, 3ᵇ, 3ᶜ, 3ᵈ, 3ᵉ, are secured together in place upon the opposite flanges of the metal channels which form the spokes 2 of the wheel. The plates 3 are bored axially to form an opening or hole in which the shaft of the band wheel is keyed or otherwise secured.

In the construction shown in Figs. 1 and 2, a rolled metal channel 7 is curved or bent to the desired diameter to form the rim of the wheel, the toes of the flanges 7ª of the channel extending outwardly. Removably secured in the depression or groove formed by the flanges 7ª of the rim channel 7 is a series of wooden blocks 8 which are bolted in place so as to form a segmental wooden rim for the band wheel. The channel 7 forming the rim of the wheel is riveted or bolted to gusset plates 9 which are secured by rivets or bolts to the outer end of the radially extending channels 2 forming the spokes of the wheel.

The tug wheel 5 is formed by bending a rolled metal channel 5ª to the desired curvature and securing the bent channel to the brackets 6 which are secured in place on the spokes 2 at an intermediate point in their length, the brackets 6 extending beyond the face of the flanges of the channels forming the spokes 2. Secured in the groove formed by the outwardly extending flanges on the channels 5ª are wooden inserts or blocks 5ᵇ which form the segmental wooden rim or periphery of the tug wheel. The rim of the tug wheel, as shown, has two V-shaped grooves in its outer surface for the bull rope of the drilling rig.

In the construction shown in Figs. 3 and 4, the bent channel forming part of the rim portion of the wheel is omitted, and segmental metal plates 10 are secured to the opposite channel flanges at the ends of the radially extending channels 2 forming the spokes of the wheel. Secured between the metal plates 10 are wooden inserts or blocks 11 which in this case form the rim of the wheel, the inserts being held in place by through bolts 12, which extend through the plates 10 in holding the wooden blocks in place.

In the modification shown in Fig. 5 a channel 13 with the toes of its flanges extending inwardly is bent to the desired diameter of the wheel and the so-formed rim of the wheel is secured to the channel flanges at the ends of the channels 2 forming the spokes of the wheel, by means of gusset plates 14, the parts being bolted or preferably riveted to the gusset plates.

As the friction pulley of the sand reel is generally made of metal, wooden rims are provided on the band wheel so as to afford a desirable contacting surface for this friction pulley. In cases where the band wheels are constructed with a steel rim only, as shown in Fig. 5, a strip of canvas or other fabric, usually a piece of canvas belting is fastened to the peripheral surface of the so-formed rim, so as to provide a proper friction surface for the metal friction pulley of the sand reel. Preferably, the surface of the metal rim is perforated, the fabric being riveted or otherwise secured to the periphery through the so-formed openings.

The advantages of my invention will be apparent to those skilled in the art. Instead of the heavy cumbersome wooden construction heretofore used in such drilling rigs, a light wheel of very great strength is provided in which standard rolled metal products are employed to form the wheel. By forming all parts of the wheel of standard rolled metal products, easily obtainable at any time, the wheel can be constructed with a minimum amount of machine work.

By the use of a plurality of rolled metal plates, which are readily obtainable at any time, to form the hub of the wheel, instead of the specially formed cast metal centers heretofore used, a cheap, easily formed center of very greatly increased strength is obtained, and the strength of the wheel is very largely increased over that of the wooden constructions heretofore used.

Modifications in the construction and arrangement of the parts may be made without departing from my invention.

I claim:—

1. A built up band and tug wheel comprising radially extending integral spokes formed of rolled metal shapes and connecting a wrought metal rim and hub portions, horizontally projecting rolled metal brackets on said spokes, and a tug wheel rim formed of rolled metal and secured in place on said brackets.

2. A band and tug wheel comprising a hub and rim and radially extending spokes formed of rolled metal shapes connecting the rim and hub portions, horizontally projecting brackets on said spokes, a rolled metal channel bent to the desired curvature fixed to said brackets, and a series of segmental wooden blocks secured in place on the metal channel rim of the tug wheel.

3. A band and tug wheel comprising a hub and rim and radially extending spokes formed of rolled metal shapes connecting the rim and hub portions, horizontally projecting brackets on said spokes, a rolled metal channel bent to the desired curvature fixed to said brackets, and a series of segmental wooden blocks secured in place on the metal channel rim of the tug wheel, the so-formed wooden rim having a peripheral V-shaped groove therein.

4. A band and tug wheel comprising a hub and rim and radially extending spokes formed of rolled metal shapes connecting the rim and hub portions, horizontally projecting brackets on said spokes, a rolled metal channel bent to the desired curvature fixed to said brackets, and a series of segmental wooden blocks secured in place on the metal channel rim of the tug wheel, the so-formed wooden rim having a plurality of peripheral V-shaped grooves therein.

In testimony whereof, I have hereunto set my hand.

ROBERT B. WOODWORTH.

Witnesses:
ROBERT A. MARBLE,
GERTRUDE SCHOTTE.